United States Patent [19]

Spinner et al.

[11] Patent Number: 4,519,670

[45] Date of Patent: May 28, 1985

[54] LIGHT-ROTATION COUPLING FOR A PLURALITY OF CHANNELS

[75] Inventors: Georg Spinner, Westerham; Manfred Lang, Taufkirchen; Anton Pautz, Munich, all of Fed. Rep. of Germany

[73] Assignee: Spinner GmbH, Elektrotechnische Fabrik, Fed. Rep. of Germany

[21] Appl. No.: 417,913

[22] Filed: Sep. 14, 1982

[30] Foreign Application Priority Data

Mar. 2, 1982 [DE] Fed. Rep. of Germany ....... 3207469

[51] Int. Cl.³ .............................................. G02B 7/26
[52] U.S. Cl. .............................. 350/96.15; 350/96.18; 350/574
[58] Field of Search ................... 350/574, 96.15, 96.18, 350/437, 96.2

[56] References Cited

U.S. PATENT DOCUMENTS

| | | | |
|---|---|---|---|
| 3,004,470 | 10/1961 | Rühle | 350/437 |
| 4,027,945 | 6/1977 | Iverson | 350/96.2 |
| 4,109,998 | 8/1978 | Iverson | 350/574 |
| 4,190,318 | 2/1980 | Upton, Jr. | 350/96.2 |
| 4,447,114 | 5/1984 | Koene | 350/96.18 X |

Primary Examiner—John K. Corbin
Assistant Examiner—Lynn Vandenburgh Kent
Attorney, Agent, or Firm—Ostrolenk, Faber, Gerb & Soffen

[57] ABSTRACT

For the transmission of a plurality of light channels between two parts which rotate relative to each other, an optical transmission element is arranged with its optical axis OA coaxial to the axis of rotation and light transmitters in different radial regions. By convex lenses or mirrors the bundles of rays coming from the light transmitters are parallelized and impinge on the optical transmission element which individually focuses the bundles of rays. In order to obtain an imaging scale of 1:1 a synchronously rotating rhomboid prism or a parabolic mirror can be used. In addition, HF channels can be transmitted.

6 Claims, 11 Drawing Figures

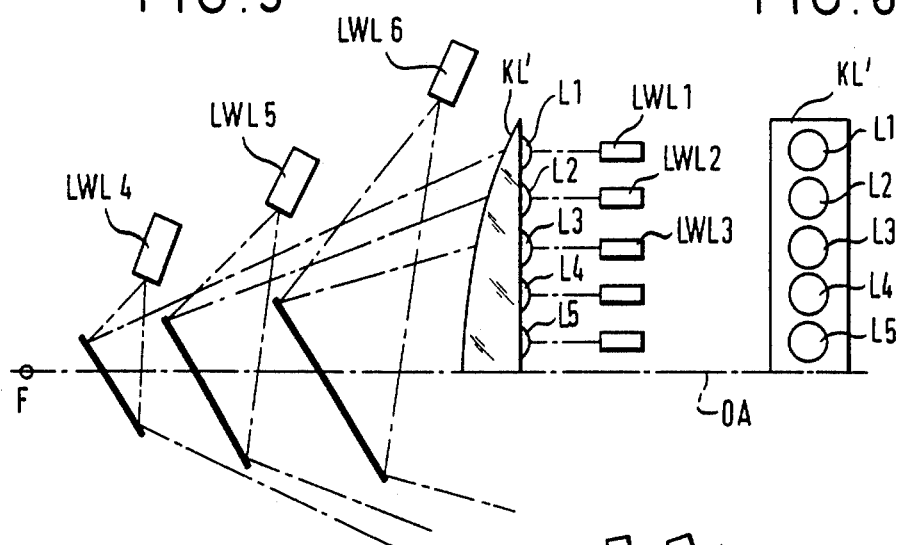
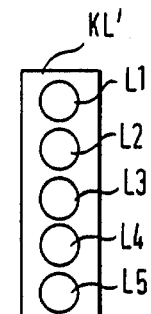
FIG. 5    FIG. 6
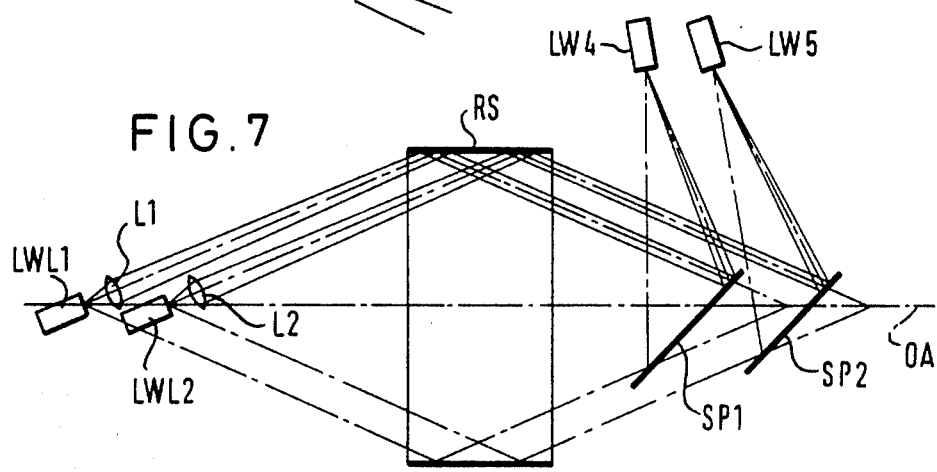
FIG. 7
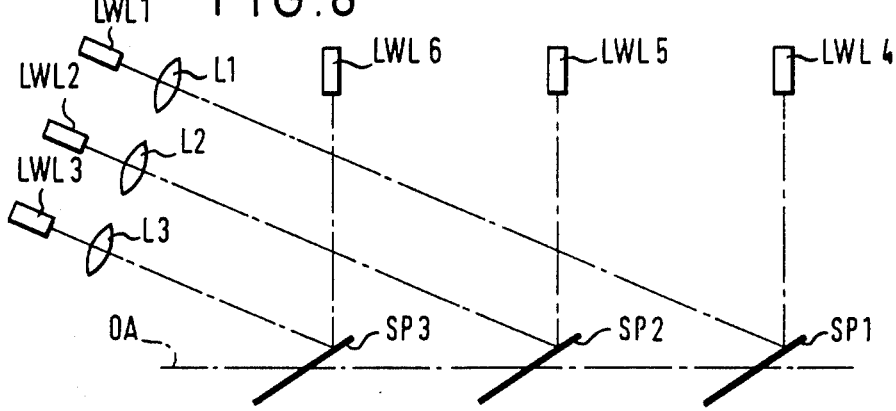
FIG. 8

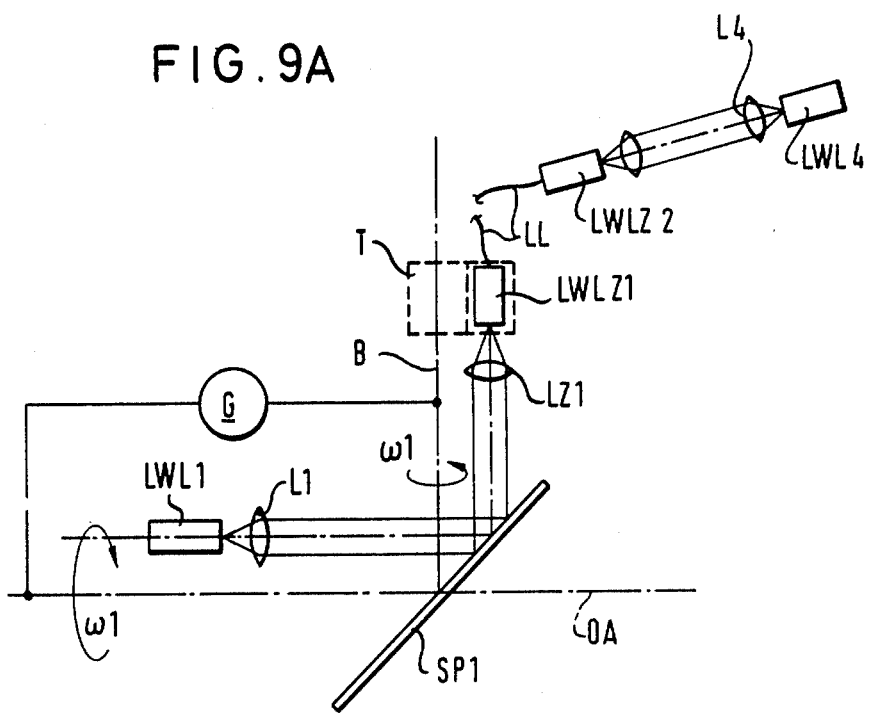

LIGHT-ROTATION COUPLING FOR A PLURALITY OF CHANNELS

Optical fiber systems are finding increasing use in technology for the transmitting of signals and data, the radiation stability and the low cost of the transmission media (glass) being considered outstanding advantages. This development suggests the development, also for light wave guides, of rotation couplings which are able to transmit light energy or light signals from a stationary part to a rotating part or vice versa. This problem can be solved relatively simply if only a single channel is to be transmitted since it can be conducted through the optical axis. However, the transmission results in difficulties when it is desired to transmit several channels separately from each other by means of a single rotation coupling. In order to achieve this purpose, the high-frequency rotation couplings with several channels can provide no suggestion. In high-frequency engineering, rotation couplings are equipped either with galvanic contacts in the form of wiper rings and brushes, or as contactless rotation couplings with corresponding coupling arrangements. Neither of these possibilities exists in connection with the transmission of light.

The object of the present invention therefore is to create a light rotation coupling which is able to transmit several channels individually from a light transmitter to an associated light receiver.

This object is achieved by the following features:

A light-rotation system comprising a coupling for a plurality of channels said coupling including a pair of support members which rotate with respect to each other; a plurality of light transmitters on one of said support members, and a corresponding number of light receivers on the other of said support members, characterized by the fact that the optical axis (OA) of an optical transmission system which has an optical transmission element which focuses the bundles of rays coming from the light transmitters in discrete bundles of light on the light receivers is arranged coaxially to the axis of relative rotation of said support members.

In this way it is for the first time possible to transmit several light channels over a single rotation coupling from several transmitters individually to several receivers. The losses and their variation during the course of a revolution are relatively slight here since the optical components can be ground with high precision and the optical axis can also be aligned very precisely to the mechanical axis of rotation. Instead of lenses, or in addition thereto, there may also be used reflection elements in the form of optically active mirrors. In addition to the light channels, HF channels which are developed in known manner with wiper contacts or else without contacts can be transmitted with the same coupling.

Further suitable developments of the invention are set forth in the subordinate claims.

Various illustrative embodiments of the invention will be described below with reference to the drawing, in which:

FIGS. 5 to 10 are diagrammatic showings of further embodiments.

The references LWL1, LWL2 and LWL3 are light transmitters which are formed in accordance with the examples by the ends of three light wave guides. The light receivers are designated LWL4, LWL5 and LWL6 and are formed by the ends of other light wave guides. Three channels are provided in accordance with the embodiments which have been shown by way of example. However, it is also possible to provide these different embodiments with more than three transmission channels or possibly also only with a single transmission channel. Furthermore, under certain conditions it is possible to interchange transmitter and receiver. The rotation takes place in the case of all embodiments around the optical axis OA, either the transmitter being stationary and the receiver rotating or the transmitter rotating around the optical axis while the receiver or receivers are stationary. Finally, it is also possible for transmitters and receivers both to rotate at different speeds or in different directions around the optical axis.

Figure 1:
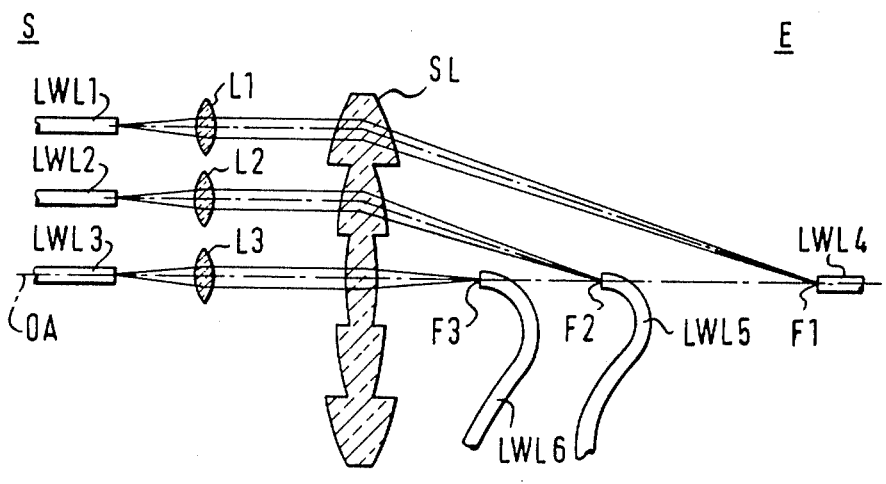
FIG. 1 is a diagrammatic showing of a rotation coupling in accordance with the invention having a stepped lens as optical transmission element.

In the embodiment of FIG. 1, the stepped lens SL can rotate together with the transmitter as well as with the receiver, or remain stationary. If it is connected for rotation with the transmitter S, the lens can be replaced by a lens section.

In all embodiments, a convex lens L1, L2 or L3 is arranged in front of the light transmitters and these lenses focus the light emerging from the light wave guides an infinity, i.e. parallel bundles of rays are produced which strike the optical transmission element. The light transmitters LWL1 to LWL3 are arranged on different radii. In accordance with the examples, they lie in a radial plane. However, they could also be arranged spaced apart in circumferential direction on different radii.

In accordance with the embodiment of FIG. 1, the optical transmission element is developed as a stepped lens SL whose steps have different focal lengths, the focal length of the innermost step being the smallest and the focal length of the outermost step the largest. The parallel bundles of rays which come from the different transmitters impinge in each case on a different step of the stepped lens and are focused accordingly at different focal points F1, F2 and F3 respectively. The ends of the light receivers LWL4, LWL5 and LWL6 are arranged at these points F1, F2, F3 respectively in such a manner that their front side is perpendicular to the optical axis. The axis of rotation coincides with the optical axis OA of the stepped lens SL so that the light fluxes from the light guides LWL1 to LWL3 are continuously focused at the focal points F1 to F3 regardless of the angle of rotation.

With this arrangement it is immaterial which part is stationary and which is moved. However, the energy flow, insofar as the transmitters LWL1 and LWL2 are concerned, can take place only in one direction, namely from left to right in FIG. 1. If transmissions are to be effected in both directions, then further channels can be fed-in, in addition, on the right-hand side via convex lenses. The reception light wave guides then lie on the left-hand side. In this embodiment as well as in all following embodiments, the central part of the optical transmission element SL could be optically inactive and have, for instance, a hole or a flat parallel plate so that the bundle of rays passes through uninterrupted. In such case the focal length of the lens L3 would be so adjusted that focusing takes place at the point F3.

Upon a full revolution of such a rotation coupling in accordance with FIG. 1, a bundle of rays which comes from LWL1 or LWL2 must, on the right-hand side move over the light wave guides of LWL5 and LWL6 respectively.

If the diameters of the bundles of rays are correspondingly large as compared with the diameter of the light wave guides, this, however, does not disturb this passage. A change in transmission of 0.1 to 0.2 dB is then to be expected. This can be achieved if the passage is placed as close as possible to the corresponding focal point F1 or F2 respectively.

Figure 2:
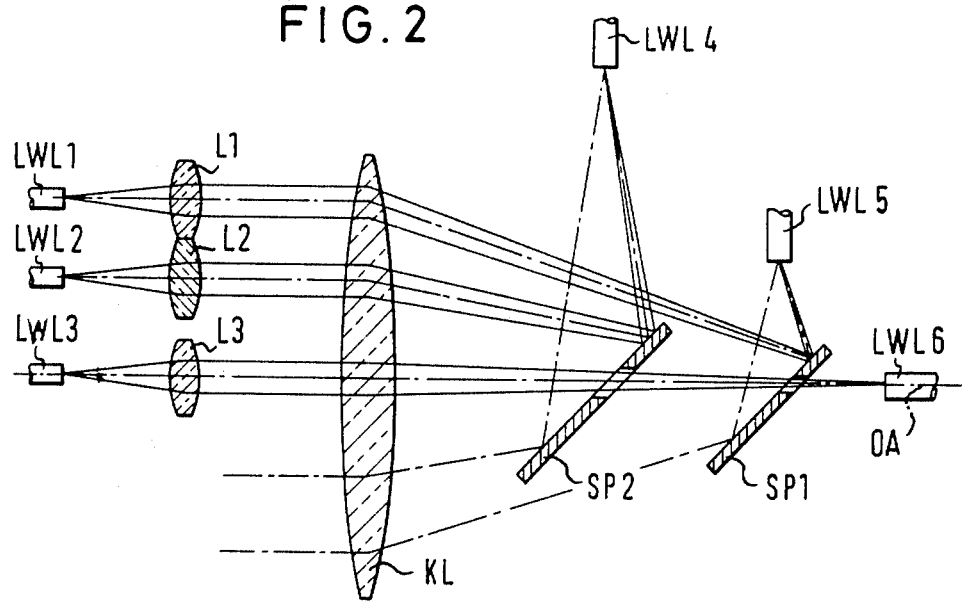
FIG. 2 shows diagrammatically another embodiment of a light rotation coupling according to the invention with convex lens and mirrors as optical transmission element.

With the embodiment shown in FIG. 2, the optical transmission element consists of a convex lens KL and mirrors Sp1 and Sp2. The lens can be stationary or it can turn with one of the parts. In the case of the convex lens KL, the bundles are all focused substantially at the same focal point. In order to be able individually to lead off the individual focusing bundles, the mirrors Sp1 and Sp2 are arranged in the manner which can be seen from FIG. 2 along the optical axis while the middle ray passes axially through holes in the mirrors Sp1 and Sp2 onto the light-guide receiver LWL6 arranged in the axis OA.

The mirrors, which are inclined at 45° with respect to the optical axis reflect the light cones radially outward onto the light receivers LWL5 and LWL4 which are fastened fixed for rotation with the mirrors.

This embodiment is characterized by the fact that a simple spherical convex lens can be used as transmission element.

Figure 3:
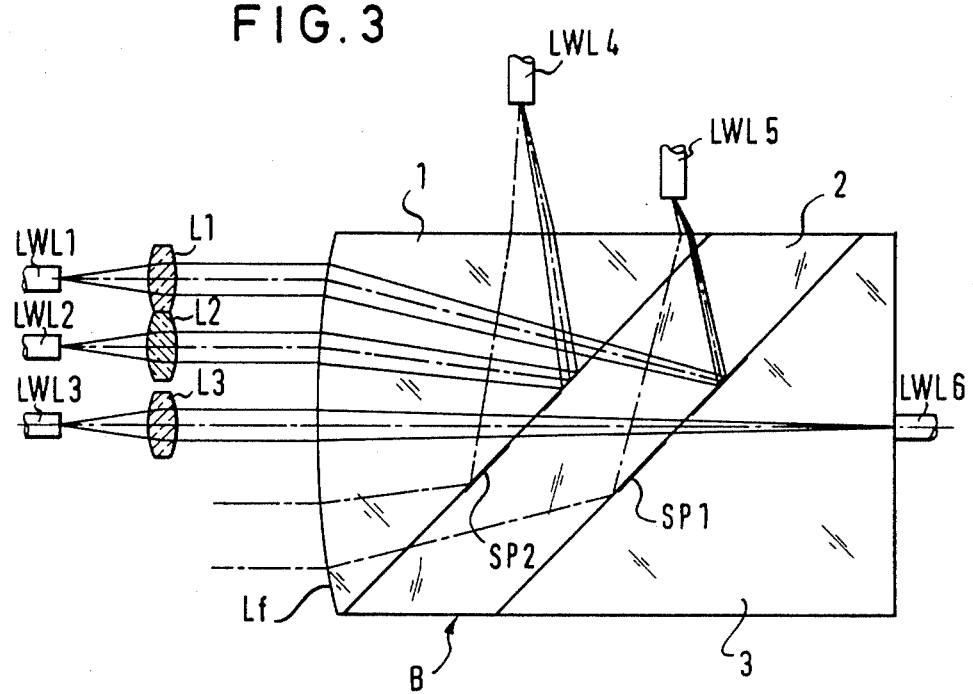
FIG. 3 is a diagrammatic showing of another embodiment of a light rotation coupling in accordance with the invention having an optical transmission element formed as solid block with convex lens and mirrors.

The embodiment of FIG. 3 corresponds optically to the embodiment of FIG. 2 and differs from it in the manner that the optical transmission element is formed by a compact block which combines convex lens and mirrors in it. This block B is turnable with respect to the light transmitters LWL1 to LWL3 or is stationary while the light transmitters rotate. The ray deflection of the parallel bundles is effected by the convexly curved front lens surface Lf of the block, which may be of square or round cross section.

The block B consists of the three parts 1, 2 and 3 which are cemented together. The block 1 which has the convex curvature Lf is cut, ground and polished on the right-hand side at an angle of 45° to the optical axis OA. Onto this layer there is applied, by thin-film technique, a surface mirror Sp2 which is interrupted at the locus of the optical axis and at an annular surface for passage of the outer bundle of parallel rays. The part 2 is developed as a flat parallel plate on the right-hand side of which there is again formed a mirror Sp1 which is interrupted at the locus of the optical axis for the inner ray bundle. The two surfaces are of optical quality. The part 3 is cut, ground and polished on the left-hand side at an angle of 45° to the optical axis and on the right-hand side perpendicular thereto. These three parts are assembled and preferably cemented in suitable manner.

Figure 4:
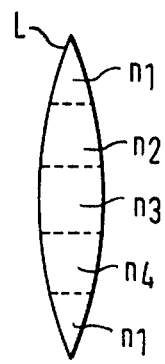
FIG. 4 is an optical transmission element in the form of a convex lens with power of refraction varying stepwise in radial direction, which can be used in combination with the embodiments of FIGS. 1 to 3.

The various embodiments can also be combined with each other, i.e. the stepped lens can also be used in the embodiment of FIG. 2 and a stepped surface can form the front end of the block 1 in the case of the embodiment shown in FIG. 3. The optical transmission element shown in FIG. 4 can be used in all embodiments and, in particular, also in the case of the embodiment of FIG. 1. This optical transmission element has the external shape of a spherical convex lens but it has several focal lengths since the different radial regions have different indices of refraction. Thus the outer region has the index of refraction $n_1$ which provides the greatest focal length. The annular region having the focal length $n_2$ is of greater refractive power and the inner circular region $n_3$ has the greatest refractive power, but this central region can be dispensed with if the converging lens L3 is suitably dimensioned.

Such a lens is manufactured in concentric rings which are then ground spherically or else aspherically on their front sides.

In accordance with the embodiment shown, light guides are used as transmitter and receiver. Instead of this, sources of light could also be used as transmitter and photodetectors as receiver.

While the outer channels can in each case be transmitted only in one direction, the central channel can be used in both directions. Finally, it is also possible to provide the mirrors with conductive connections in order to modulate the light rays. Furthermore, the optical transmission elements can be made in whole or in part of electrooptical materials. All optical surfaces can be coated in order to reduce the losses.

As light transmitter there can also be used a laser beam with suitable modulation.

FIGS. 5 and 6 correspond to the embodiment of FIG. 2, the lenses L1 to L5 being cemented onto a convex lens section KL' and the parts KL', L1 to L5 and the transmitters LWL1 . . . being connected with each other for rotation. The lens section can also be replaced by a prism.

In all the embodiments described, refraction elements are used as optically active members. However, it is also possible instead of this to use reflection elements in the form of concave mirrors and the like which, in combination with the flat mirrors shown, produce an optical imaging on the light receivers.

FIG. 7 shows another possibility, a cylindrical annular mirror RS being provided concentric to the optical axis OA.

In the embodiment of FIG. 8, the lens which is common to all channels has been omitted and the bundles of light are directed from L1 to L3 directly onto the mirrors Sp1 to Sp3 in the optical axis.

Figure 9:
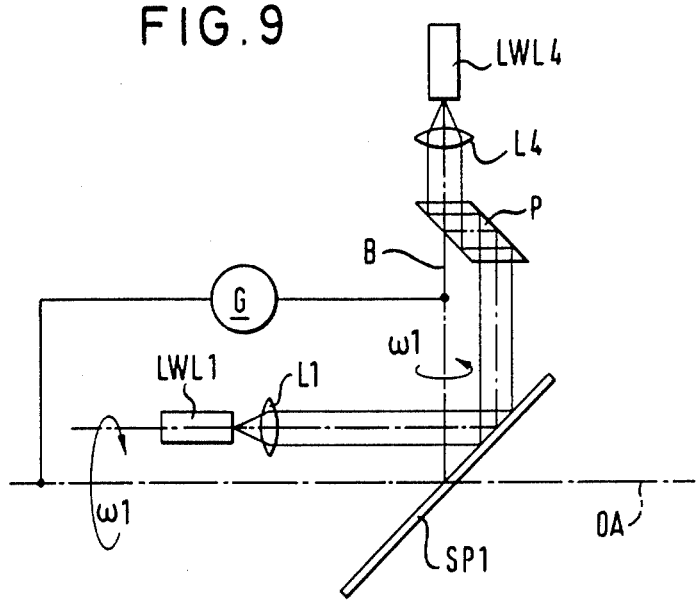

FIG. 9 shows an embodiment which differs from the preceding embodiments in the manner that a parallel bundle of rays is sent over the optical transmission elements. This has the advantage that an imaging scale of 1:1 can be obtained, as is useful for numerous purposes of use (instead of this, however, other imaging scales can, if necessary, also be obtained). In the embodiment shown, merely one light transmitter LWL1 and one light receiver LWL4 are provided. However, several channels can be transmitted on different radii and a channel may, furthermore, be arranged in the axis of rotation OA of the system. The light transmitter LWL1 whose optical axis lies parallel to the axis of rotation OA rotates with the angular velocity $\omega_1$ around the axis OA. The rotation of a rhomboid prism P is synchronized with the rotation of the light transmitter LWL1, said prism rotating with the same angular velocity $\omega_1$ around an axis B which intersects the axis of rotation OA at right angles. The synchronization is effected, for instance, by a gearing G. The point of intersection of the two axes OA and B lies on the surface of the deflection mirror Sp1 arranged at an angle of 45°. The optical axis of the bundle coming from the transmitter is deflected radially outward by the mirror Sp1 and enters the prism P in the manner which can be noted from FIG. 9, leaving it in the axis of rotation B of the prism. This axis is directed to the light receiver LWL4. A convex lens L1 is provided in front of the light transmitter and produces a bundle of parallel rays, while in front of the light receiver there is a convex lens L4 which focuses the bundle of parallel rays onto the light receiver. In this way an imaging scale of 1:1 can be obtained with the use of identical convex lenses.

The embodiment of FIG. 9A corresponds to the embodiment of FIG. 9 with the difference that the rotating prism P is replaced by a system which has a light receiver LWLZ1 with convex lens LZ1 in front of it and a light transmitter LWLZ2 with convex lens LZ2 as well as a flexible light guide LL in between. The receiver LWLZ1 is mounted for rotation in a part T which rotates synchronously with LWL1 around the axis B in such a manner that LSLZ1 rotates with the bundle of parallel rays on a circle without changing its angular position so that the light guide LL is not twisted.

Figure 10:
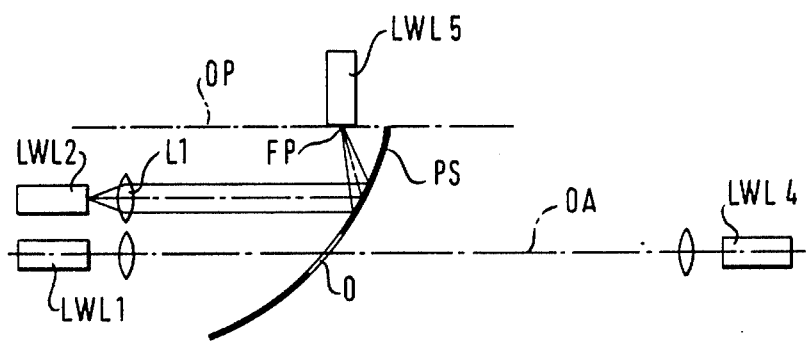

Another embodiment is shown in FIG. 10. Here a transmission channel lying in the optical axis or the axis of rotation OA is provided between light transmitter LWL1 and light receiver LWL4. Parallel to this transmitter there is another transmitter LWL2 with which a receiver LWL5 is associated at right angles thereto. Additional channels, not shown in the drawing, can also be arranged on different radii around the axis of rotation OA. A parabolic mirror PS is connected for rotation with the light receiver LWL5. This system is fixed with respect to the rotating light-transmitting system or it turns relative to the stationary light transmitters. The optical axis of the parabolic mirror PS extends parallel to the axis of rotation OA and the arrangement is such that the focal point FP of the parabolic mirror PS coincides with the light receiver LWL5.

The bundle of light is passed parallelized onto the parabolic mirror by a lens L1 in front of the light transmitter LWL2. Since in the case of the parabolic mirror all rays which are parallel to the axis OP are deflected as focal rays, unambiguous focusing on the light receiver results during the rotation over different reflection surfaces of the parabolic mirror. It is not necessary in this connection to provide a complete parabolic mirror but merely a portion thereof over which the rotating bundle of light of the transmitter or transmitters moves. In this case also an imaging scale of 1:1 can be obtained by suitable selection of the parabola parameters and of the focal length of the lens L1.

We claim:

1. Apparatus for transmitting a plurality of channels of light between two members where the members have rotational movement with respect to each other;
said plurality of channels of light having light receiving means individual to each channel on one of said members;
said light receiving means for each channel being spaced successively at different radial distances from the axis of said rotational movement;
the other of said members having light output means individual to each channel, the said light output means being spaced successively at different distances along the axis of relative rotation;
each light receiving means corresponding to a light output means; and
means for directing the light from each light output means to the light receiving means corresponding thereto.

2. Apparatus for transmitting a plurality of channels of light between two members where the members have rotational movement with respect to each other;
said plurality of channels of light having light output means individual to each channel on one of said members comprising a set of light elements; and light receiving means for each channel on the other of said members also comprising a set of light elements; one set of light elements being arranged at different radial distances from the axis of rotation movement, the other set of light elements being spaced successively at different distances along the axis of relative rotation, each light receiving means corresponding to a light output means; and means for directing the light between each pair of light elements on members.

3. Apparatus for transmitting a plurality of channels of light between two members where the members have rotational movement with respect to each other around a single longitudinal axis, each of said plurality of channels of light having light output means individual to each channel and light receiving means individual to each channel; the light output means and the light receiving means individual to each channel being mounted on separate members which are spaced from each other;
each light receiving means corresponding to a light output means; and
each of said light output and light receiving means constituting a light element, the light elements on one of said members being spaced successively radially from the axis of said rotational movement; the light elements on the other of said support members being spaced successively along the axis of relative rotation, each pair of light elements including one light output element and one light receiving element constituting a single light channel and being mounted on opposite members; and means between the said members for directing the light for each channel between a pair of light elements on the said two members.

4. The apparatus of claim 3 for transmitting a plurality of channels of light wherein said means between the said members for directing the light for each channel between the said pair of light elements includes a reflector between said pair of light elements to cause each channel of light to traverse an angular path.

5. The apparatus of claim 4 wherein said reflector is parabolic.

6. The apparatus of claim 4, wherein said means between the said members for directing the light for each channel between the said pair of light elements also includes a prism interposed in each channel to displace each channel in a direction transverse to the principal path of said channel.

* * * * *